US005808723A

United States Patent [19]
Klees

[11] Patent Number: 5,808,723
[45] Date of Patent: Sep. 15, 1998

[54] PHOTOFINISHING SYSTEM HAVING CUSTOMIZED CUSTOMER ORDER PAYMENT FEATURE

[75] Inventor: Kevin John Klees, Rochester, N.Y.

[73] Assignee: Eastman Kodak Company, Rochester, N.Y.

[21] Appl. No.: 653,371

[22] Filed: May 21, 1996

[51] Int. Cl.[6] .......... G03B 27/52
[52] U.S. Cl. .......... 355/40; 396/311
[58] Field of Search .......... 355/40, 39, 42; 396/311, 429

[56] References Cited

U.S. PATENT DOCUMENTS

| | | | |
|---|---|---|---|
| 4,065,661 | 12/1977 | Jaskowsky . | |
| 4,834,306 | 5/1989 | Robertson et al. . | |
| 4,947,196 | 8/1990 | Wash . | |
| 4,965,626 | 10/1990 | Robison et al. . | |
| 5,093,686 | 3/1992 | Shigaki . | |
| 5,113,351 | 5/1992 | Bostic . | |
| 5,130,745 | 7/1992 | Cloutier et al. . | |
| 5,181,786 | 1/1993 | Hujink | 400/61 |
| 5,229,810 | 7/1993 | Cloutier et al. . | |
| 5,344,730 | 9/1994 | Kitamoto | 430/14 |
| 5,473,402 | 12/1995 | Long et al. . | |
| 5,696,576 | 12/1997 | Itoh et al. | 355/40 |

FOREIGN PATENT DOCUMENTS

| | | | |
|---|---|---|---|
| 89/08901 | 9/1989 | WIPO | G07F 17/00 |

*Primary Examiner*—Eddie C. Lee
*Assistant Examiner*—John Chizmar
*Attorney, Agent, or Firm*—Frank Pincelli

[57] ABSTRACT

A consumer interactive apparatus and method for ordering photofinishing services for a photosensitive film. The photosensitive film is provided with a device for indicating a prepaid amount of photofinishing services available. The apparatus includes an input device for allowing entry of a photofinishing order, a mechanism for receiving a film containing a magnetic media for indicating a prepaid amount of photofinishing services, and reading device for reading the magnetic media for determining the amount of prepaid photo services available. The input device allows the user to select the desired type of photofinishing services with respect to the film being supplied to the apparatus. The apparatus allows the customer to order photofinishing service as desired by the customer and also allows debiting of the magnetic layer such that the amount remaining after the placement of the order is placed on the magnetic layer.

12 Claims, 4 Drawing Sheets

PHOTOFINISHING SYSTEM HAVING CUSTOMIZED CUSTOMER ORDER PAYMENT FEATURE

FIELD OF THE INVENTION

The present invention relates to an automated interactive photofinishing system which receives photographic film for processing by a customer.

BACKGROUND OF THE INVENTION

Traditional methods of photofinishing photographic roll film involves an individual taking exposed film to a photofinishing store, or mailing the exposed film to a photofinishing processing center, where the film is processed. When the film is sent by mail, typically payment by check accompanies the order. In the situation where film is dropped off at a photofinishing store, the customer will generally make payment when the developed prints are picked up.

Recent advances in film technology, such as described in U.S. Pat. No. 4,834,306, disclose a photographic film cartridge wherein the filmstrip contained therein may be thrust out of the cartridge and returned back into the cartridge a plurality of times (hereinafter referred to as "thrust cartridge"). For example, the thrust film cartridge can be used as a permanent storage for the processed film, and can be used with related film handling equipment which can be configured to accept the thrust film cartridge. Commonly assigned U.S. Pat. Nos. 4,947,196; 4,965,626; 5,130,745; and 5,229,810, incorporated herein by reference, disclose a photographic filmstrip having a virtually transparent, magnetic film layer on the non-emulsion sides of the filmstrip (referred to as an MOF layer). It is disclosed in conjunction with various camera systems. One or more longitudinal read/write tracks are provided in the MOF layer between the side edges of the image frame area and the filmstrip where information such as film exposure information and information relative to processing and subsequent use (e.g., printing) of a exposed image frame is recorded during exposure of the filmstrip in the tracks. As described in U.S. Pat. Nos. 5,229,810 and 5,130,745 referred to above, certain of the tracks may be reserved for recording information by the camera, or for use by the photofinisher. Thus, it is known to provide certain information regarding photofinishing of the film. It has been suggested that such information could include the fact that certain promotional prints are provided with the order and/or that the order has been prepaid.

U.S. Pat. No. 5,113,351 discloses an automatic interactive film processing system which eliminates all human handling of film once it is deposited by the customer. The system includes an apparatus which accepts film products and information concerning a customer order at a customer service station having a display screen for communicating information to the customer. The device accepts an exposed film cartridge, payment for processing, and prints a receipt claim check. The customer would then leave the apparatus and return at some later time, which may be indicated on the claim check, to pick up their developed film and prints. Upon return to the apparatus, the customer would enter a unique order number from their claim check via a user interface.

A problem with the automated photofinishing system is that the customer is required to make some type of payment. An additional problem with the prior art system is that when promotional activities are provided by the retailer and/or manufacturer, they are typically limited to a particular pre-set condition, that is, a free second print, or a free 8×10 may be provided with the customer order. There is no ability for the customer to tailor these promotional features to suit their own personal desires.

Applicants have invented a photofinishing system where at the time of presenting the film for photofinishing, no additional money need be provided by the customer. Additionally, the customer has the ability to select any combination of print order selections up to a predetermined value.

SUMMARY OF THE INVENTION

In one aspect of the present invention there is provided a consumer interactive apparatus for ordering photofinishing services for a photosensitive film. The photosensitive film is provided with means for indicating a prepaid amount of photofinishing services available. The apparatus includes an input means for allowing entry of a photofinishing order, means for receiving a film containing means for indicating a prepaid amount of photofinishing services, and means for reading the indicating means for determining the amount of prepaid photo services available. The input means allows the user to select the desired type of photofinishing services with respect to the film being supplied to the apparatus.

In another aspect of the present invention there is provided a consumer interactive apparatus for ordering of photofinishing services for a photographic film having a magnetic layer on which a predetermined amount of prepaid photofinishing services is placed. The apparatus includes means for receiving the film, means for reading the amount of photofinishing services credit available on the magnetic layer, and means for allowing the customer to order photofinishing service and allow debiting of the magnetic layer such that the amount remaining after the placement of the order is placed on the magnetic layer.

In accordance with yet another aspect of the present invention there is provided a method of prepaying customized photofinishing services of photographic film, comprising the steps of:

a) recording on the photographic film information relating to the amount of credit available for use in ordering photofinishing services for the photographic film; and b) adjusting the amount of credit available on the media in accordance with the value of photofinishing services ordered.

DETAILED DESCRIPTION OF THE INVENTION

Figure 1:
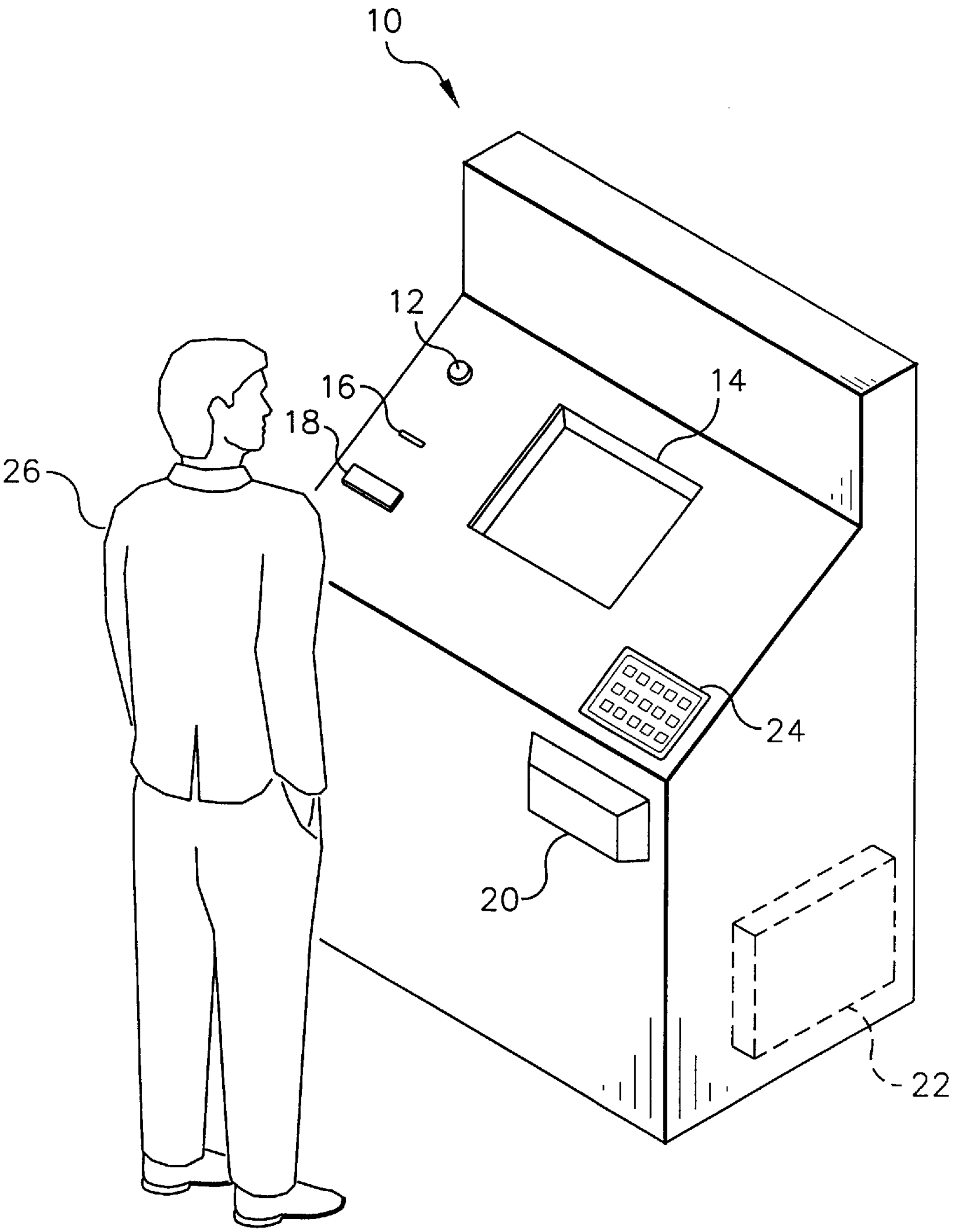
FIG. 1 is a perspective view of a photofinishing apparatus made in accordance with the present invention.
Figure 5:
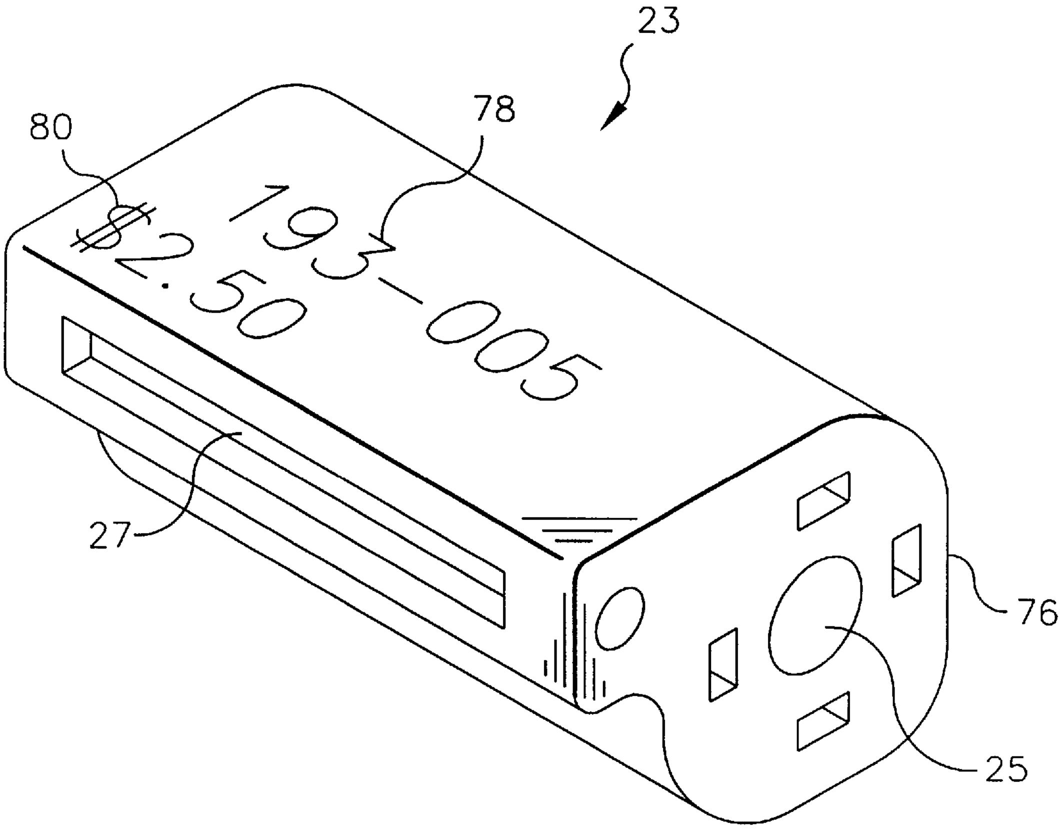
FIG. 5 illustrates a thrust film cartridge containing a photographic filmstrip such as illustrated in FIGS. 2 or 3 which is designed for use in the apparatus of FIG. 1.

Referring to FIG. 1, there is illustrated an automatic customer interactive photofinishing apparatus 10 made in accordance with the present invention. The apparatus 10 includes a film acceptance mechanism 12 for accepting a film cartridge containing exposed, but not developed, film. The apparatus further includes a touchscreen video display 14, for example, a CRT for displaying customer order instruction and for optionally entering customer order information by the customer 26, a payment mechanism 16, a claim check printer 18, and a completed order delivery mechanism 20 for delivering a completed customer order. The apparatus 10 further includes a central processing unit (computer) 22, which is used to control operation of the apparatus 10 and various other components thereof. In the embodiment illustrated, acceptance mechanism 12 is designed to receive an undeveloped roll of film contained in a film cartridge 23 (as illustrated in FIG. 5). In the particular embodiment illustrated, the cartridge 23 is of the thrust film type cartridge, such as illustrated and described in detail in U.S. Pat. No. 5,093,686. The cartridge 23 includes a spool 25, which is rotatably mounted to the cartridge 23 and is secured to one end of the filmstrip placed therein. A door 27 is provided on the cartridge for allowing egress and engress of the filmstrip to the cartridge. A keypad 24 is also provided on the apparatus 10 for allowing a customer to interact with the apparatus 10.

The film acceptance mechanism 12, keypad 24, CRT 14, payment mechanism 16, and completed order delivery mechanism 20 are arranged so as to comprise a customer workstation 19 whereby the customer can fully interact with the apparatus 10. In the preferred embodiment illustrated, the workstation is designed to be used by a single customer to assist in providing privacy to the customer.

The display device 14, in the particular embodiment illustrated, is used to display instructional order information which is used by the customer to enter order information into keypad 24. However, the display device 14 can also be used for various other functions, for example, but not by way of limitation, can be used to preview images developed by the apparatus prior to printing an image and can also be used as a touchscreen for customer order selections.

The cartridge acceptance opening 12 is designed such that the film cartridge 23 as programmed will be forwarded to a processing unit where the film contained therein is developed. An example of the possible processing apparatus is described in copending application U.S. Ser. No. 08/330,271, filed Oct. 27, 1994, entitled "Method and Apparatus for Processing Photosensitive Film", by Daniel M. Pagano, Richard B. Wheeler, and Kevin J. Klees, which is hereby incorporated by reference. This application describes an apparatus capable of processing the filmstrips without detaching the exposed film from the cartridge. The elimination of detaching of a detach/attach film procedure from the cartridge as is typically provided in photofinishing operations, made possible the inclusion of a robust connection between the film and cartridge.

Figure 2:
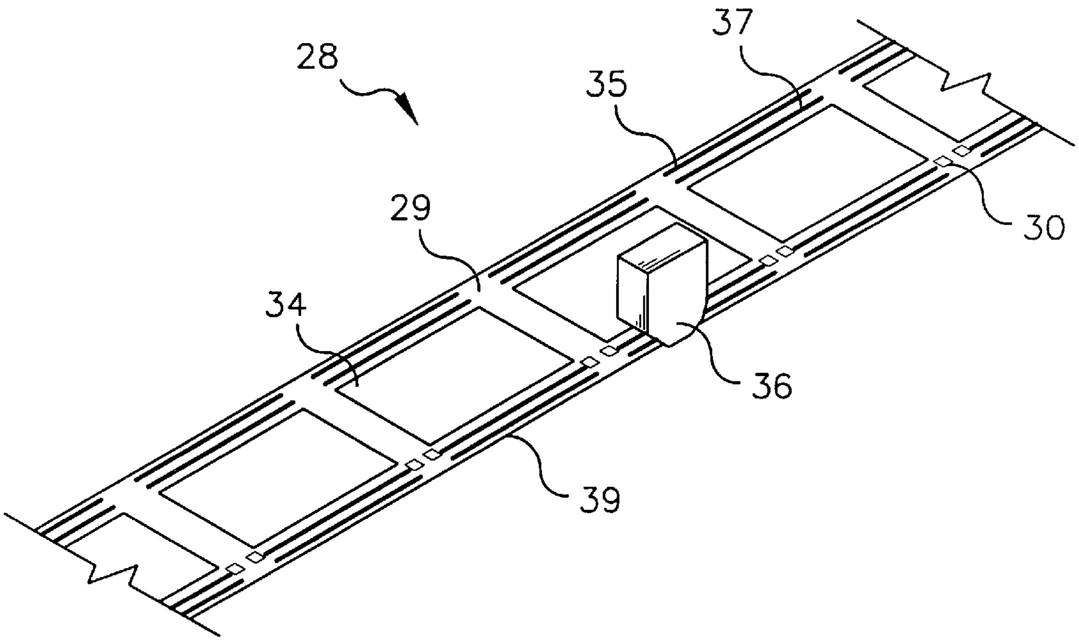
FIG. 2 is a perspective view of a magnetic read/write head in the apparatus of FIG. 1 for reading and writing of magnetically encoded information on a magnetic media placed on a film which has been inserted into the apparatus of FIG. 1.

Referring to FIG. 2, there is illustrated a photosensitive filmstrip 28 that has been placed in the apparatus 10 as it is being passed by magnetic read/write head 36. The filmstrip 28 includes a thin layer of magnetic media 29, which in the preferred embodiment illustrated is a substantially transparent layer placed over the entire filmstrip 28. As can be seen, the layer 29 is provided such that a pair of magnetic tracks 35,37 are provided between the image area 34 and the edge 39 of the filmstrip. The magnetic read and write head reads information that has been prerecorded and is also capable of erasing and writing information onto the magnetic tracks. In the preferred form of the present invention, the magnetic tracks are provided with information regarding the prepayment of photofinishing services. For example, the magnetic tracks 35,37 can have information that $10.00 worth of photofinishing processing has been provided with the purchase of the film. This information can be scanned and provided to the CRT for verification to the customer as to the amount of money available for processing of the order. As can be seen in FIG. 5, appropriate identifying indicia is provided on the cartridge 23. In particular, indicia 78 is provided and is typically referred to as the cartridge identification (CID). Indicia 80 is also provided on the cartridge 23 regarding the amount of prepaid processing initially provided with the purchase of the film. In the particular embodiment illustrated, $2.50 has been provided for processing of the film.

Figure 4:
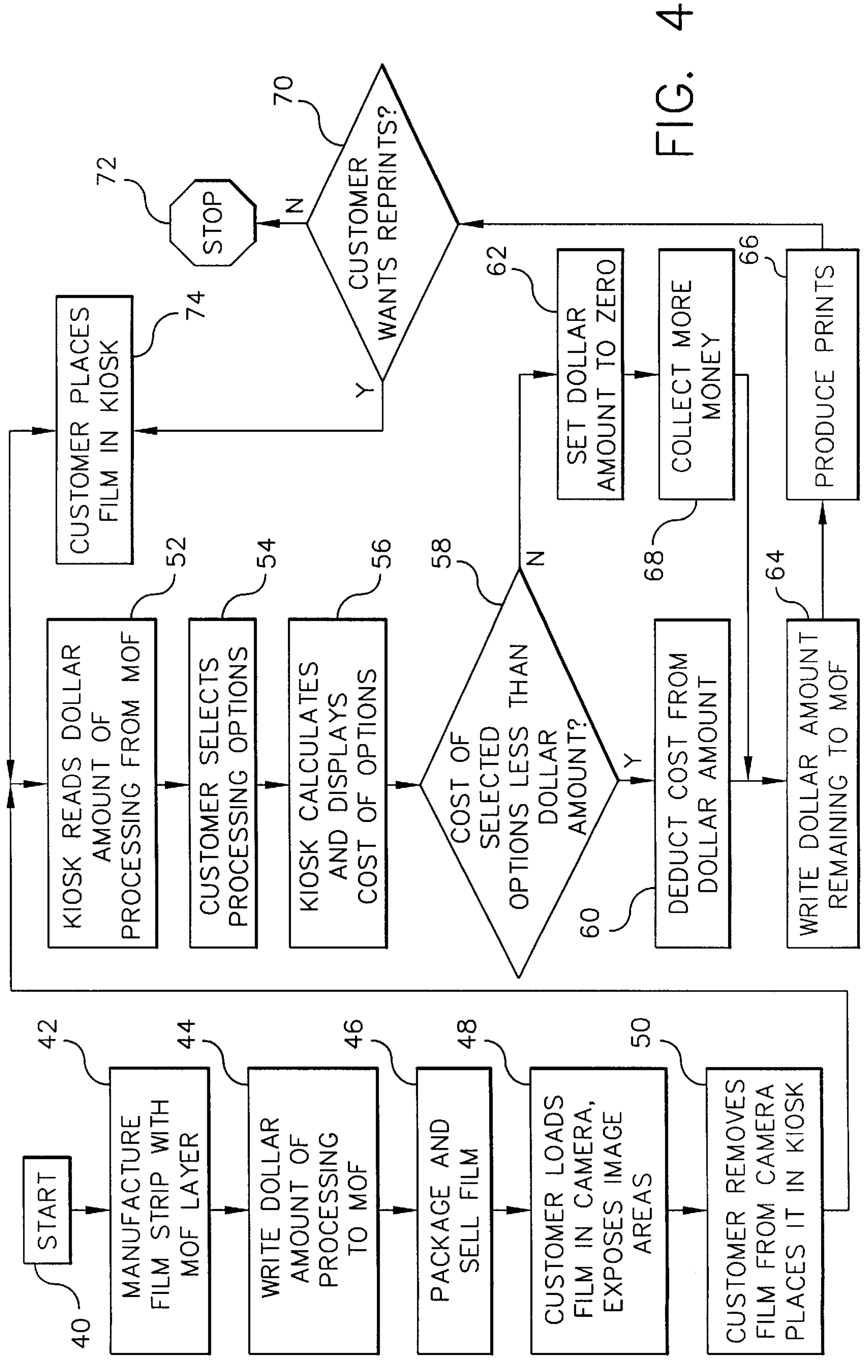
FIG. 4 is a flow chart illustrating the processed steps in using the apparatus of FIG. 1.

Referring to FIG. 4, there is illustrated a flow chart as to the operation of the system according to the present invention. The process starts with the manufacturer providing a filmstrip 28 having a magnetic layer 29 as illustrated by box 42. The manufacturer, either in accordance with its own promotional activities, or in accordance with the promotion activities of the retailer, writes an appropriate code on the magnetic layer 29 indicating the amount of credit availability for processing of the film which is being purchased. Thereafter, the film is packaged and sold to the retailers, which in turn, as illustrated by box 46 in the flow chart, is sold to consumers. Thereafter, the customer, as illustrated by box 48, loads the film in a camera and exposes the film. Thereafter, the customer removes the film from the camera and takes the exposed film to apparatus 10 as illustrated by box 50. The customer places the film cartridge 23 in the apparatus 10, and the apparatus 10 reads the dollar amount of processing available from the information written on the magnetic layer 29. This can be done initially in a light-tight environment without affecting the exposed, but not developed, film contained therein. The customer, using the appropriate selections on the CRT and keypad 24, selects the appropriate order. For example, the customer may select one print of every exposed image on the film, or may select certain size prints, for example, 8×10 for some of the images on the film. The apparatus 10 (or kiosk) then calculates the cost of the order and determines whether or not this is more or less than the amount available as indicated by box 58. If there is a sufficient amount of prepaid processing, then the appropriate amount will be deducted. Magnetic head 36 would then write the remaining amount of credit available on layer 29 should the amount of the order not be sufficient to use all the money available as indicated by box 64. If the amount of the order is equal to or greater than the amount available on the film, then the dollar amount is set to zero as indicated by box 62, and if money is owed, additional money is collected by the payment mechanism 16 as indicated by box 68. Optionally, the apparatus 10 would mark out the original amount of credit shown by indica 80 on the cartridge 23 and write on the cartridge 23 any remaining credit available if a printer is provided. If the customer desires additional processing credit, this additional credit may be added on the film for later use. Then, the orders are produced as indicated by box 66. In the particular embodiment illustrated, the apparatus 10 is a fully automatic processing apparatus wherein the film is not only processed, but is also capable of producing prints thereby providing a completed customer order within minutes. However, if desired, the order can be picked up by a photofinisher and then returned whereby the customer can pick them up at a later date.

With regard to reprints, the process is very similar except the process starts by the customer selecting reprints at box 70 and then placing the developed film in the apparatus 10, box 74, where the apparatus 10 reads the amount of credit available for processing and then operation of the apparatus continues in a similar manner as previously stated before, except that processing of the film is no longer necessary.

Figure 3:
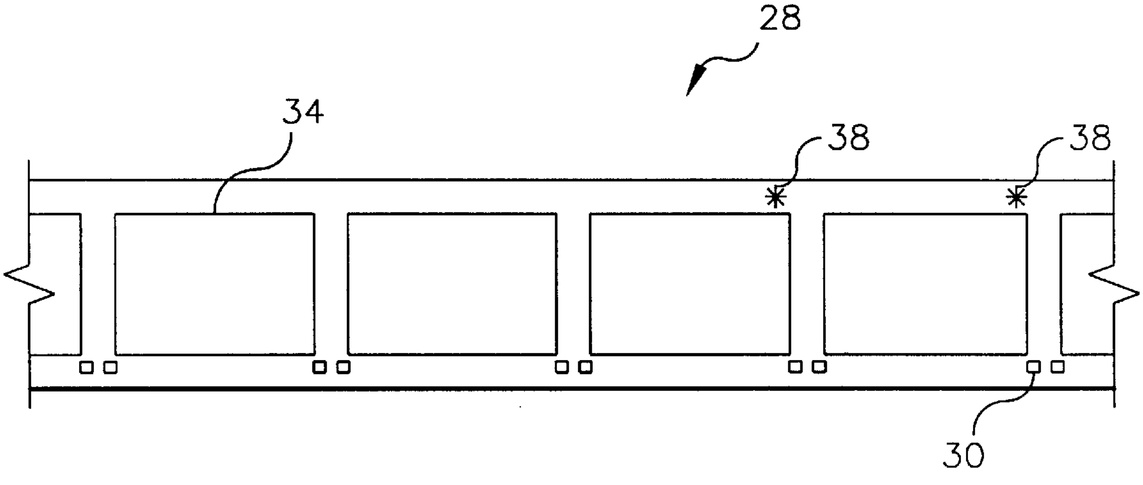
FIG. 3 illustrates a modified photographic filmstrip for use in the apparatus of FIG. 1 having cost code indicia for indicating the amount of prepaid processing.

While in the preferred embodiment the processing credit is magnetically written on the filmstrip which allow recrediting of the filmstrip, the present invention is not so limited. For example, referring to FIG. 3, there is illustrated a modified filmstrip 28 made in accordance with the present invention. In this embodiment, indica 38 is permanently recorded on the filmstrip 28 either by a permanent marking device or by optical exposure of film emulsion provided in this restricted area. Indica 38 would be indicative of a predetermined amount of credit. The indica would be read by apparatus 10 by any appropriate scanner or other device which can read the machine readable indica as is well known to those of ordinary skill in the art of machine readable devices. The credit read would then be used by the customer to make the order as desired.

In the preferred embodiment illustrated images are printed onto photosensitive paper as is well known in the art. However any appropriate print engine may be used, for example but not by way of limitation, a thermal print device such as the Kodak XLS thermal printer.

The present invention provides a photofinishing system where at the time of presenting the film for photofinishing, no additional money need be provided by the customer. Additionally, the customer has the ability to select any combination of print order selections up to a predetermined value.

It is to be understood that various changes and modifications may be made without departing from the scope of the present invention. The present invention being limited by the following claims.

PARTS LIST

10 . . . apparatus
12 . . . film acceptance mechanism
14 . . . CRT
16 . . . payment mechanism
18 . . . claim check printer
19 . . . workstation
20 . . . delivery mechanism
22 . . . central processing unit
23 . . . film cartridge
24 . . . keypad
25 . . . spool
26 . . . customer
27 . . . door
28 . . . filmstrip
29 . . . magnetic media
34 . . . image area
35,37 . . . magnetic tracks
36 . . . magnetic read/write head
38,78,80 . . . indicia
39 . . . edge
42,46,48,50,58,62,64,66,68,70,74 . . . box

I claim:

1. A consumer interactive apparatus for ordering photofinishing services for a photosensitive film, said photosensitive film having means for indicating a prepaid amount of photofinishing services available, comprising:

a) input means for allowing entry of a photofinishing order;

b) means for receiving a film containing means for indicating a prepaid amount of photofinishing services;

c) means for reading said indicating means for determining the amount of prepaid photo services available; and d) said input means allowing the user to select the desired type of photofinishing services with respect to the film being supplied to said apparatus.

2. An apparatus according to claim 1 wherein said apparatus further comprises display means for providing instructions to the user.

3. An apparatus according to claim 1 wherein said indicating means for indicating the amount of prepaid photofinishing services available comprises a magnetic layer provided on the film.

4. An apparatus according to claim 1 wherein said indicating means comprises a symbol placed on said film which is indicative of a predetermined amount of prepaid photofinishing services.

5. An apparatus according to claim 1 wherein the amount of credit available is printed on the cartridge in which the film is returned to the user.

6. An apparatus according to claim 1 wherein said apparatus is a fully automated apparatus wherein the film may be developed and then printed onto a photosensitive paper and the paper is also developed.

7. A consumer interactive apparatus for ordering of photofinishing services for a photographic film having a magnetic layer on which a predetermined amount of prepaid photofinishing services is placed, comprising:

means for receiving said film;

means for reading the amount of photofinishing services credit available on said magnetic layer; and means for allowing the customer to custom order photofinishing service and allows debiting of said magnetic layer such that the amount remaining after the placement of the order may be placed on said magnetic layer.

8. An apparatus according to claim 1 wherein said film is provided in a thrust film cartridge.

9. A method of prepaying customized photofinishing services of photographic film, comprising the steps of:

a) providing a photograph with a magnetic media for retaining of information;

b) recording on said magnetic media an amount of credit available for use in ordering photofinishing services for said photographic film; and c) adjusting the amount of credit available on said media in accordance with the value of photofinishing services ordered.

10. The method according to claim 10 further comprising the step of:

adjusting the amount of credit available in response to payment of additional funds.

11. A method of prepaying customized photofinishing services of photographic film, comprising the steps of:

a) recording on said photographic film information relating to the amount of credit available for use in ordering photofinishing services for said photographic film; and b) adjusting the amount of credit available on said media in accordance with the value of photofinishing services ordered.

12. The method according to claim 11 wherein indica is printed on the film for indicating the amount of credit available.

* * * * *